Jan. 20, 1970 — T. F. OETH — 3,490,144
MACHINE FOR REMOVING LIDS FROM CONTAINERS
Filed Feb. 6, 1968 — 2 Sheets-Sheet 1
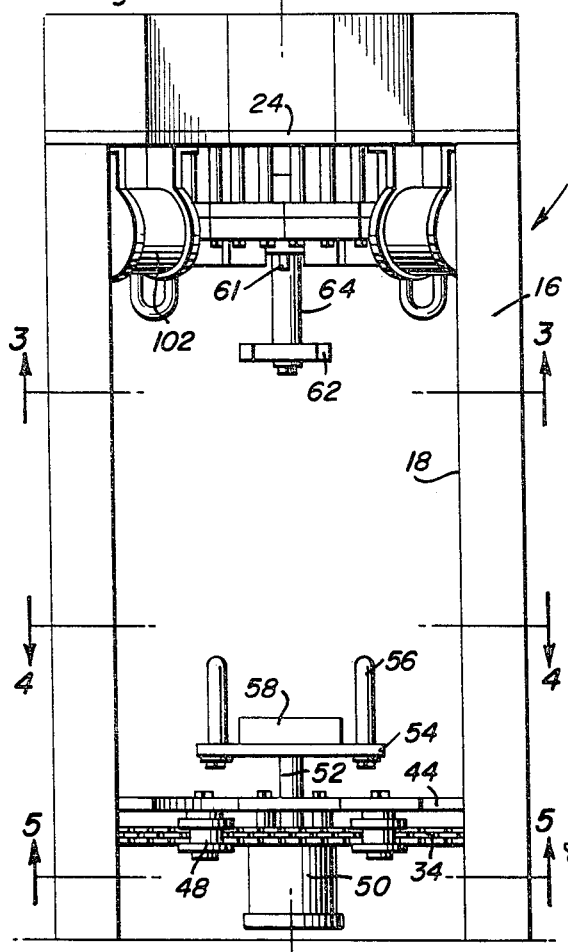
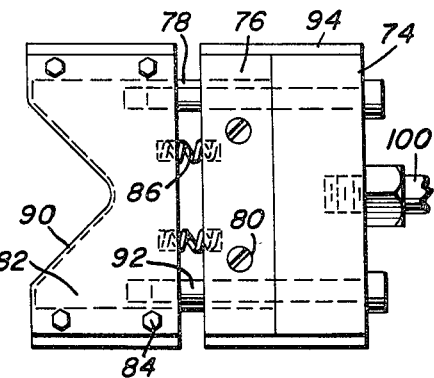
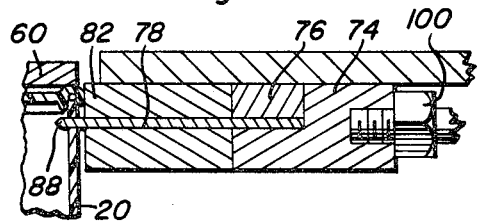
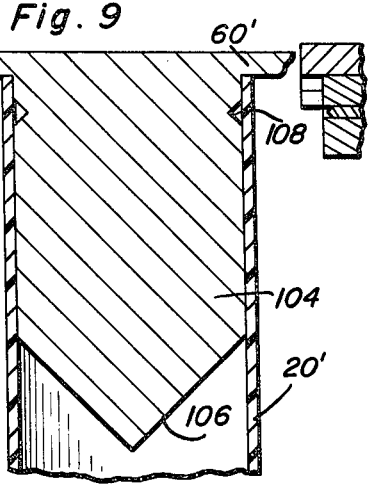
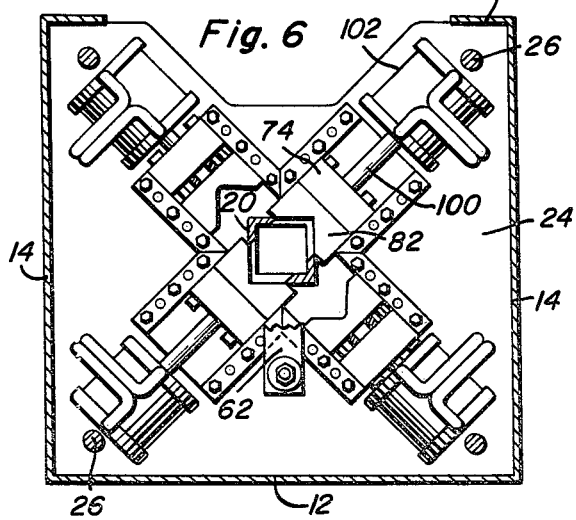
Thomas F. Oeth
INVENTOR.

Jan. 20, 1970 T. F. OETH 3,490,144
MACHINE FOR REMOVING LIDS FROM CONTAINERS
Filed Feb. 6, 1968 2 Sheets-Sheet 2

Thomas F. Oeth
INVENTOR.

BY *Clarence A. O'Brien*
and *Harvey B. Jacobson*
Attorneys

United States Patent Office 3,490,144
Patented Jan. 20, 1970

3,490,144
MACHINE FOR REMOVING LIDS FROM
CONTAINERS
Thomas F. Oeth, Dubuque, Iowa, assignor to Dubuque
Packing Company, a corporation of Iowa
Filed Feb. 6, 1968, Ser. No. 703,357
Int. Cl. B67b 7/38
U.S. Cl. 30—4                                  8 Claims

ABSTRACT OF THE DISCLOSURE

A machine to cut a lid off of a container so that the enclosed product may be removed with the edge of the open end of the container being left in a smooth and level condition perpendicular to the side wall of the container to allow the container to be re-used by employing a new lid. The machine includes a supporting plate on which a container is supported with the lid thereof moved upwardly to engage a backing plate. A plurality of knife assemblies are then actuated for making two cuts at diametrically opposed points and in the same horizontal plane. The first set of knives cuts more than fifty percent of the perimeter of the container and the second set of knives complete the cut and are actuated after the first set has been actuated and retracted.

---

In my copending application entitled Method and Apparatus for Packing Food in Plastic Containers, there is disclosed a plastic container on which a lid is fused for enclosing a food product so that the food product may be cooked while in the container. Where a number of the containers are to be opened in order to remove the cooked food product, it is normal to re-use the containers by providing another lid thereon. In order to re-use the containers, the open end thereof must be smooth and substantially perpendicular to the side wall of the container.

It is an object of the present invention to provide a machine to cut a lid from a container to enable the enclosed product to be removed with the lid cutting operation being conducted so that the top perimeter of the container is left in a level smooth plane which is square and substantially perpendicular to the side walls of the container so that the container may be resealed by employing a lid and following the procedure outlined in the above mentioned copending application.

Another object of the present invention is to provide a machine for removing a lid from a container of substantially square configuration including a support structure for the container and two sets of knife assemblies operable to cut through the side wall of the container immediately adjacent the lid to remove the lid and leave the container with the top edge thereof smooth and in the same plane.

Another important object of the present invention is to provide a machine in which the uneven top perimeter of a container may be cut off to form a smooth edge in the same horizontal plane perpendicular to the side wall of the container thus enabling the containers to be opened by using a manual opening method and subsequently refinished by the operation of the knife assemblies.

Yet another important object of the present invention is to provide an apparatus in accordance with the preceding objects which is relatively simple in construction, dependable in operation and inexpensive to manufacture and operate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the machine for removing lids from containers of the present invention;

FIGURE 6 is a sectional view of the knife assemblies illustrating one set of knives actuated for cutting through more than one-half of the periphery of the container;

FIGURE 7 is a plan view of one of the knife assemblies;

FIGURE 8 is a detailed sectional view of the knife assembly of FIGURE 7 illustrating its association with the container and lid; and FIGURE 9 is a sectional view similar to FIGURE 8 but illustrating an alternate construction in which the upper edge portion of an open ended container may be cut off for forming a smooth edge.

Figure 2:
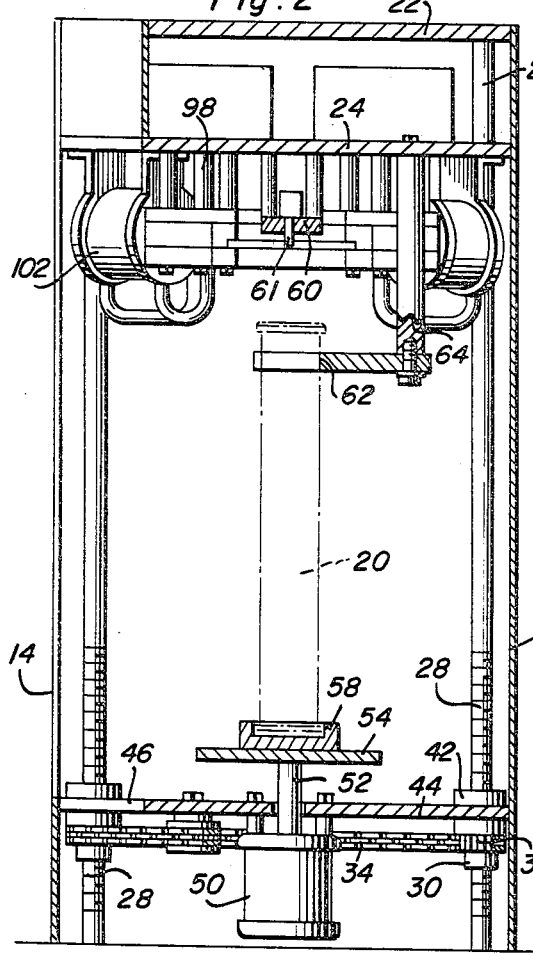
FIGURE 2 is a vertical sectional view taken substantially upon a plane passing along section line 2—2 of FIGURE 1 illustrating the structural details of the machine.
Figure 3:
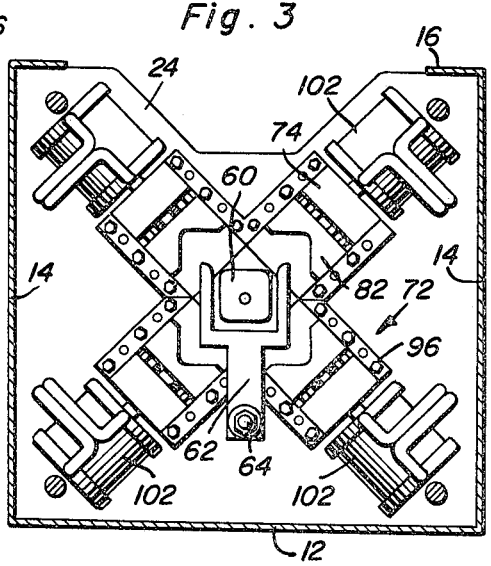
FIGURE 3 is a transverse, sectional view taken substantially upon a plane passing along section line 3—3 of FIGURE 1 illustrating further structural details of the knife assembly arrangement.
Figure 4:
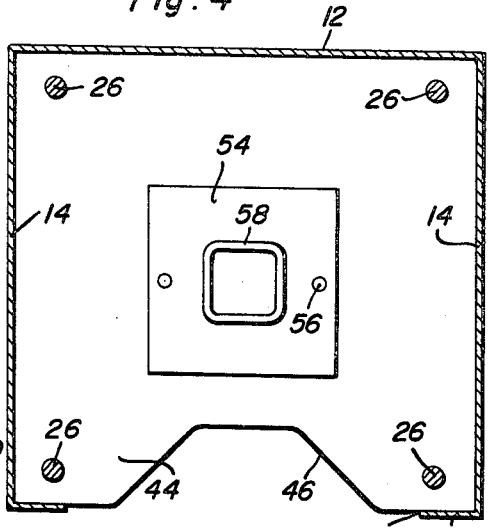
FIGURE 4 is a transverse, sectional view taken substantially upon a plane passing along section line 4—4 of FIGURE 1 illustrating the construction of the supporting plates for the containers.
Figure 5:
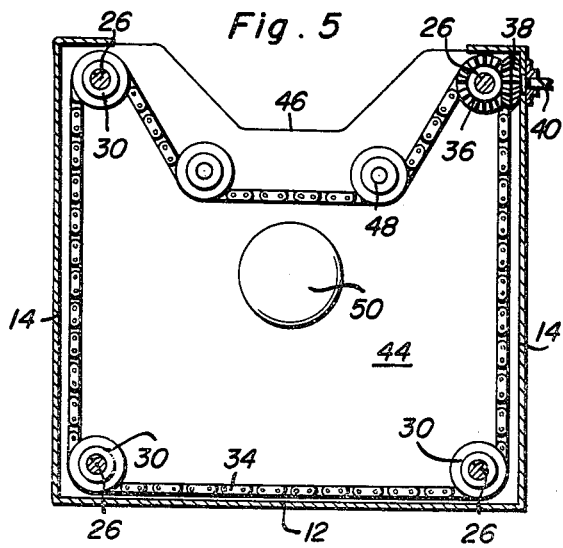
FIGURE 5 is a transverse, sectional view taken substantially upon a plane passing along section line 5—5 of FIGURE 1 illustrating the manner of adjusting the lower supporting structure for handling containers of different heights.

Referring to the drawings, the numeral 10 generally designates the machine for removing lids from containers of the present invention which includes a housing defined by a rear wall 12 and side walls 14 perpendicular thereto. The side walls are provided with partial front walls 16 defining an enlarged open area 18 for insertion of containers 20 into the machine. Top plates 22 and 24 are provided in spaced relation at the upper end of the walls and provide a rigid support structure for four elongated mounting rods 26 disposed at the corners respectively of the machine. Each of the rods 26 has the lower end portion thereof externally threaded as at 28. The externally threaded end portion 28 of each rod receives an internally threaded nut 30 which is in the form of a sprocket gear 32 over which a sprocket chain 34 is entrained. One of the sprocket gears 32 or nut 30 is provided with a bevel gear 36 in meshing engagement with a similar bevel gear 38 having an operating shaft 40 extending outwardly of the side wall 14 and provided with a suitable crank handle or reversible motor for operation of the shaft 40, gears 38 and 36 and the sprocket chain 34 thus rotating all of the threaded nuts 30 in unison. The threaded nuts 30 are operatively connected with the sleeve structure 42 which supports the platform 44 for vertical reciprocation in response to rotation of the threaded nuts 30. The front of the platform 44 is notched at at 46 to facilitate operation of the machine and a pair of idler rollers 48 are journalled on the platform 44 to guide the sprocket chain 34 around the recess 46. This construction enables verticle adjustment of the platform 44 in relation to the walls 12, 14 and 16.

Supported from the central area of the platform 44 is a fluid pressure and piston and cylinder assembly 50 such as an air cylinder having an actuating rod 52 extending upwardly through the platform 44 and terminating in a support plate 54. The support plate 54 is provided with a pair of upstanding pins 56 and an upstanding flange 58 thereon for receiving the bottom end of the containers and supporting the same in position. An initial adjustment of the platform may be made for a particular size of container and thereafter each container placed on the supporting plate 54 will be elevated by the air cylinder 50 into engagement with a backing plate 60 supported from the top member 24. The backing plate fits within the rim of the plastic on top of the lid and properly positions the top of the container for the cutting operation. Also, a U-shaped side guide 62 is provided for engaging an intermediate portion of the container 20 and this guide is also supported by a depending support member 64 from the top member 24 as illustrated in FIGURE 2.

Supported from the top plate 24 are four knife assemblies arranged radially and each generally designated by the numeral 72. Each knife assembly includes a mounting block 74 having a recess in one corner thereof receiving a clamp bar 76 for clampingly engaging the knife 78 therebetween by the use of fastening bolts 80 or the like. Disposed inwardly of the mounting block 74 is a pair of shield blocks 82 which are secured together by fasteners 84 disposed outwardly of the side edges of the knife blade 78 so that the shielf blocks 82 may reciprocate in relation to the knife blade 78. A pair of coil springs 86 are interposed between the shield blocks and the mounting block 74 to urge the two assemblies apart sufficient that the sharpened cutting edge 88 of the knife blade 78 is retracted between the shield blocks 82. The retracted position is illustrated in FIGURE 7 and when the shield blocks engage the container or the lip on the lid thereof, they will be retained in stationary position while the blade 78 is projected outwardly beyond the outer edge of the shield blocks 82 for cutting the container 20 as illustrated in FIGURE 8.

For cutting the containers of substantially square configuration, both the shield blocks 82 and the knife blade 78 are provided with a V-shaped notch 90 of generally right angular configuration with the inner corner thereof rounded to conform generally with the rounded corner of the container 20.

Guide rods 92 interconnect the block 74 and the shield blocks 82 to guide the movement thereof and to limit the movement of these components apart. Also, the outer edges of the blocks 74 and 82 are provided with projecting flanges 94 which are slidably retained in track forming flanges 96 attached to the top plate 24 by suitable brackets 98 thus enabling reciprocation of the knife assemblies radially in relation to the container 20. An actuating rod 100 is connected with the mounting block 74 in an adjustable manner for reciprocation of the knife assemblies with the rod 100 being in the form of a piston rod associated with an air cylinder 102 which are preferably double-acting air cylinders and are arranged in diametrically opposed sets or pairs.

As illustrated in FIGURE 6, one of the knife assemblies has been actuated which may be considered the first knife assembly and as illustrated, more than one-half of the perimeter of the container 20 has been cut through. After the first set of knife assemblies have been extended and cut more than one-half of the perimeter of the container, the first set of knife assemblies is retracted and the second set of knife assemblies automatically actuated to complete the cut on the container at the same horizontal level thereby completely cutting off the lid of the container as illustrated in FIGURE 8.

FIGURE 9 illustrates the same type of container 20' in which the lid has already been removed by manual means or some other means but the upper end or perimeter of the container 20' is rough or uneven. In this situation, the backing plate 60' is provided with a depending back-up guide 104 which has a tapered lower end 106 and a V-shaped groove 108 peripherally thereof for forming a backing to the inner surface of the container 20' so that the knife blades 78 may cut therethrough thus providing a smooth upper edge to the container 20'.

This machine will effectively remove the lids and allow the removal of the cooked food from the containers and permit reuse of the containers. The container with the lid thereon is placed on the platform and the air piston elevates the platform to move the container upwardly against the backing plate. One set of knives cuts slightly more than fifty percent of the perimeter of the container directly below the lid. These knives retract and the second set of knives cuts the remainder of the perimeter of the container. The base platform then lowers and the food product can be removed from the containers. The knives make a smooth cut such that the lip of the container is square and parallel to the bottom of the container. The container then can be resealed by placing a new lid on it and repeating the closing process disclosed in the copending application.

The stroke of the cylinder 50 having the platform 54 thereon may conveniently be four inches and by adjusting the platform initially on the rods 26, containers of various heights may be effectively opened by employing the machine. Each of the cutting head assemblies has an air cylinder 102 which also preferably has a four inch stroke. Control valves, microswitches, wiring, etc. have not been illustrated and are mounted in the top of the machine with the particular details of the valves and control switches forming no particular part of the invention.

In operation, the container is placed in the machine with the bottom placed in the guides on the support plate 54 with the container resting in the guide 62. If necessary, the platform 44 is manually adjusted so that the top of the container is within four inches of the backing plate 60. A manually operated switch is then activated to start the operating cycle of the machine.

The activation of the switch activates the air cylinder 50 attached to the supporting plate 54 which causes the supporting plate and container 20 to rise until the container lid comes in contact with the backing plate and is securely held by the rim of plastic in the lid which fits around the backing plate. As the container contacts the backing plate 60, it pushes the rod 61 located in the center of the backing plate which is attached to a microswitch which activates the valves on two air cylinders 102 located opposite each other. The air pressure forces the two cutting head assemblies against the container with the outer portion of the two opposite cutting head assemblies contacting the side body of the container and stabilizing the container. At the same time, the air pressure pushes the knives through the guard or shield sections of the cutting head assemblies thus cutting through the side body of the container. When the cutting head assemblies reach the limit of their movement, air pressure is released and the cutting head assemblies retract. The springs 86 in the cutting head assemblies force the guard or shield sections back over the knives when the pressure against the guards is removed. The first set of knives cut slightly more than fifty percent of the perimeter of the container with slightly over twenty five percent of the cut being on one corner and slightly over twenty five percent of the cut being on the opposite corner as illustrated in FIGURE 6. As the first set of cutting head assemblies retract, they activate a microswitch that controls the air cylinders on the other two cutting head assemblies which are extended and function identically to the first set and cut the remaining portion of the container. As the second set of cutting head assemblies retract, they activate a switch which releases the pressure on the air cylinders mounted under the supporting plate and the container then drops clear of the cutting head assemblies and is removed from the machine.

In the event the lid has been removed by some means, other than the machine of the present invention, the top perimeter of the container may not be smooth nor level and not suitable for resealing. In this event the machine can be altered to cut the top edge of the container so that it is level, smooth and suitable for resealing. In order to use the machine to cut a small portion of the end of an open container, the backing plate 60 would be removed and the modified backing plate 60' would be substituted therefor. The backing plate 60' with the extension 104 and the tapered end 106 thereon may be easily inserted into the container when the container is placed in position on the platform. The container still would be inserted against the backing plate 60' and a manual button is then pushed that activates the first set of cutting head assemblies. The action and timing of the cutting head assemblies in this arrangement are identical to those previously described. After the top edge of the container has been cut, the container is removed from the cutting machine with the top perimeter thereof being smooth and level and suitable for resealing.

What is claimed as new is as follows:

1. A machine for forming a continuous circumferential cut through the peripheral wall of a container comprising a supporting platform for engaging one end of the container, a plate opposed thereto for engaging the other end of the container for removably retaining the container stationary, and knife assemblies disposed radially of the container for operative movement toward and away from the periphery of the container, said knife assemblies being disposed in opposed pairs with the knife assemblies in each pair being operative simultaneously for cutting opposed portion of the periphery of the container, each of said knife assemblies including a cutter blade disposed in perpendicular relation to the container, all of said blades being confined to the same circumferential plane perpendicular to the container for forming continuous circumferential cut through the periphery of the container that is straight, continuous, smooth and perpendicular to the longitudinal axis thereof.

2. The structure as defined in claim 1 wherein said supporting platform is movably supported for movement toward and away from the plate for grippingly engaging the container.

3. The structure as defined in claim 1 together with a guide engaging the container intermediate the ends thereof to position the container and stabilize the container intermediate the ends thereof.

4. The structure as defined in claim 1 wherein said knife assemblies are each operated by a fluid pressure operated piston and cylinder assembly, each blade having a shield normally covering the blade and being spring biased to expose the blade upon contact with the container.

5. The structure as defined in claim 1 wherein said plate includes an extension having a tapered end for insertion into the open end of the container for providing a backing surface in opposed relation to the knife assemblies, said extension having a peripheral groove therein in alignment with the blades to enable the blades to penetrate the peripheral wall of the container.

6. The structure as defined in claim 4 wherein said platform includes socket means thereon for positioning the container, said platform being mounted on a fluid pressure operated piston and cylinder assembly for movement toward and away from the plate for grippingly engaging the container.

7. The structure as defined in claim 6 wherein said fluid pressure operated piston and cylinder assembly is mounted on a supporting base, means adjusting the supporting base in relation to the plate to enable the position of the platform and fluid pressure operated piston and cylinder assembly to be adjusted to receive containers of different lengths.

8. The structure as defined in claim 1 wherein each knife assembly blade has a substantially V-shaped configuration with a rounded apex for cutting and cooperating with the rounded corner of a substantially square container, and a support member supporting each knife assembly and including guide means for guiding the blades during reciprocation thereof.

References Cited

UNITED STATES PATENTS

| 1,845,213 | 2/1932  | Ames    | 30—4   |
| 1,892,582 | 12/1932 | McCollom | 30—4  |
| 2,012,955 | 9/1935  | Cabot   | 30—4   |
| 2,532,898 | 12/1950 | Drugman | 30—4   |
| 2,583,034 | 1/1952  | Wibling | 30—4   |
| 2,711,580 | 6/1955  | Conway  | 30—4   |
| 2,984,375 | 5/1961  | Gardner | 30—4 X |
| 3,121,284 | 2/1964  | Hudson  | 30—4   |

ROBERT C. RIORDON, Primary Examiner

G. F. GRAFEL, Assistant Examiner

U.S. Cl. X.R.

30—6, 16